US009952659B2

(12) United States Patent
Joseph et al.

(10) Patent No.: US 9,952,659 B2
(45) Date of Patent: Apr. 24, 2018

(54) PRESENTATION OF MULTIPLE SOURCES OF APPLICATION GUIDANCE INFORMATION

(75) Inventors: Joshy Joseph, Redmond, WA (US); Jason Hogg, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 569 days.

(21) Appl. No.: 13/291,123

(22) Filed: Nov. 8, 2011

(65) Prior Publication Data

US 2013/0117668 A1   May 9, 2013

(51) Int. Cl.
*G06F 3/01* (2006.01)
*G06F 15/16* (2006.01)
*G06F 9/44* (2006.01)
*G06Q 30/02* (2012.01)

(52) U.S. Cl.
CPC .............. *G06F 3/01* (2013.01); *G06F 9/4446* (2013.01); *G06F 15/16* (2013.01); *G06Q 30/0278* (2013.01)

(58) Field of Classification Search
CPC ............ G06F 9/4446; G06F 17/30864; G06F 11/3438; G06F 17/30528
USPC ........................................................ 715/708
See application file for complete search history.

(56) References Cited

U.S. PATENT DOCUMENTS 6,311,194 B1   10/2001  Sheth et al.
6,892,352 B1*  5/2005  Myers .............. G06F 17/30905
                                          707/E17.121
7,299,415 B2* 11/2007  Opheim ................ G06F 9/4446
                                          715/705
7,502,770 B2*  3/2009  Hillis et al. ...................... 706/45
2002/0126140 A1*  9/2002  Gorbet et al. ................. 345/708
2003/0001875 A1*  1/2003  Black et al. ................... 345/708
(Continued)

OTHER PUBLICATIONS

Amir, et al., "Semantics for Intelligent Delivery of Multimedia Content", Retrieved at <<http://www.lifl.fr/~martinej/papers/bilasco10semantics.pdf>>, Symposium on Applied Computing, Mar. 22-26, 2010, pp. 1366-1372.
(Continued)

*Primary Examiner* — Andrea Long
(74) *Attorney, Agent, or Firm* — Fiala & Weaver P.L.L.C.

(57) ABSTRACT

A product guidance system is described herein that provides consistent methods and processes to aggregate product guidance from different online (and potentially local) sources, to ensure that the guidance aggregation is done with proper quality criteria (e.g., content/author reputation), to define how guidance is aggregated and presented appropriately for the context (e.g., a novice user may see different UI experience and different content than an advanced user), and to specify how the guidance is delivered within the product surface itself. The system defines a consistent information asset type meta-model, applies a semantic approach and algorithms to aggregate guidance content from varying sources and deliver through consistent interfaces, and provides an asset and user interface composition model to present the retrieved information following flexible categorization and navigation schemes. Thus, the product guidance system helps product teams deliver the right information, within the right context, and within the product surface.

19 Claims, 8 Drawing Sheets

(56) References Cited

U.S. PATENT DOCUMENTS

| | | | |
|---|---|---|---|
| 2003/0018978 A1* | 1/2003 | Singal ............... | G06F 17/30899 725/115 |
| 2004/0268259 A1* | 12/2004 | Rockey et al. ............... | 715/708 |
| 2006/0085750 A1* | 4/2006 | Easton et al. ................. | 715/708 |
| 2006/0086781 A1* | 4/2006 | Jung et al. .................... | 235/375 |
| 2006/0253465 A1* | 11/2006 | Willis ................ | G06F 17/2247 |
| 2006/0265436 A1* | 11/2006 | Edmond ........... | G06F 17/30017 |
| 2007/0113180 A1* | 5/2007 | Danninger .................... | 715/705 |
| 2007/0220429 A1* | 9/2007 | Kureshy et al. .............. | 715/708 |
| 2008/0109723 A1* | 5/2008 | Burton et al. ................ | 715/708 |
| 2008/0172612 A1* | 7/2008 | Allen et al. ................... | 715/708 |
| 2009/0100381 A1* | 4/2009 | McAfee ................ | G06Q 30/02 715/855 |
| 2009/0183237 A1* | 7/2009 | Cortes et al. .................... | 726/4 |
| 2009/0199097 A1* | 8/2009 | Black et al. .................. | 715/708 |
| 2009/0320082 A1* | 12/2009 | Collazo ................. | H04N 7/165 725/105 |
| 2010/0004975 A1 | 1/2010 | White et al. | |
| 2010/0070448 A1 | 3/2010 | Omoigui | |
| 2010/0180011 A1* | 7/2010 | Sood ....................... | G06F 15/16 709/219 |
| 2010/0250513 A1 | 9/2010 | Guha | |
| 2011/0060809 A1 | 3/2011 | Cohen et al. | |
| 2011/0153636 A1 | 6/2011 | Coldicott et al. | |
| 2012/0042002 A1* | 2/2012 | Smith et al. .................. | 709/203 |
| 2013/0117362 A1* | 5/2013 | Sugiura .................. | G06Q 10/10 709/203 |

OTHER PUBLICATIONS

Knock, Mirjam, "Towards Intelligent Adaptative E-Learning Systems—Machine Learning for Learner Activity Classification", Retrieved at <<http://www.fim.uni-linz.ac.at/Publications/K%C3%B6ck/K%C3%B6ck_ABIS09.pdf, Retrieved Date: Jul. 15, 2011, pp. 6.

* cited by examiner

PRESENTATION OF MULTIPLE SOURCES OF APPLICATION GUIDANCE INFORMATION

BACKGROUND

Software applications can perform a virtually limitless set of tasks today. Applications span all categories, from knowledge worker applications like MICROSOFT™ Word and Excel, to connectivity applications like email and instant messaging clients, to business applications like MICROSOFT™ Configuration Manager and BizTalk, to server applications like MICROSOFT™ Exchange, and so forth. Although ease of use is often a feature considered by software designers, due to the many functions that software applications provide, they cannot all work the same. Each application often involves user education to enable users to get the greatest benefit from the application and to learn each of the application's differentiating abilities.

Including instructional material directly within a software application has long been a common feature. Applications often provide a Help menu, F1 or other help invoking keystrokes, and context-sensitive help information. Help information has evolved from early information that resembled paper documentation (e.g., MICROSOFT™ HLP files with tables of contents and indexes like books) to more web-like content today with the rise of the Internet (e.g., MICROSOFT™ CHM files that include links, more visual content, and so forth). With the increase in continuously available Internet connections, many applications include online instructional material from the software designer and client-side logic for combining both online and locally available help information.

Many online forums often develop for discussing the use of popular software products. In such forums, users may discuss how to perform specific tasks, solving problems with an application, configuring the application to behave in a certain way, exchanging developer resources such as scripts, and so on. Forums may include sites that span products, such as MICROSOFT™ TechNet (technet.microsoft.com), as well as product specific sites, such as www.exchangeserverhelp.com for discussing MICROSOFT™ Exchange Server. Users often locate these forums and sites using search engines through a web browser. For example, a user might search using keywords related to a particular problem the user is facing or task the user is trying to perform.

One problem with current software application instructional material is that it is very static in nature. Even for software applications that include an online component, the instructional material provided by the online component is often updated very slowly, and may not include helpful information about all of the problems a user may have with the application. Users still find that they are digging through search results to try to find an answer to obscure or unanticipated problems. Blogs and other web sites usually provide more relevant and updated content. As a result, the documentation resources of the product team are wasted, as customers scour the web for the information they desire, bypassing the already stale content delivered by the product learn. In addition, customers find help through an experience that is disconnected from the application, and often loses the context of what the user is doing. This increases the amount of material that the user has to sift through to find helpful information. In addition, as the product team often exerts no control over these outside sources of information, they cannot assure the quality of the information or that the suggestions do not encourage use of the product outside of its design parameters.

In one example scenario, a novice user is executing a WINDOWS™ POWERSHELL™ script from a scripting editor shipped with the WINDOWS™ POWERSHELL™ product. The software raises an exception with a specific error code. The user normally performs one of the following actions: 1) go to product documentation available online or within the product and search for the error code or exception, or 2) go to a Web browser, open a search engine, and search for the error code. As a novice user, the above actions may render him varying results. Product documentation may not have the correct error code or updated knowledge base articles published to address the specific error. Product documentation may also lack guidance in the real world usage scenario, which may be a combination of multiple products from the same or different companies. Online search may cover product documentation, community forums, and other knowledge places and present a large number of search results. This may retrieve large numbers of results that may not be targeted to the issue (or applicable to the current context) the customer is facing. Additionally, the customer makes a context switch from the current task (and tool) to find this information. The user is now confused. The user may conclude that he needs to spend more time to resolve the issue and the product guidance is too limited.

In another scenario, an information technology (IT) administrator at the Contoso organization uses scripts to automate his daily tasks. One day he notices that he needs a script to manage the automated installation of new operating system security patches. He would like to explore the available scripts to support this task from his enterprise internal repository or from cloud script repositories. This is currently a manual, serial search of various sources to find the information, if the information exists at all.

SUMMARY

A product guidance system is described herein that provides consistent methods and processes to aggregate product guidance from different online (and potentially local) sources, to ensure that the guidance aggregation is done with proper quality criteria (e.g., content/author reputation), to define how guidance is aggregated and presented appropriately for the context (e.g., a novice user may see different UI experience and different content than an advanced user), and to specify how the guidance is delivered within the product surface itself. The system defines a consistent information asset type meta-model, applies a semantic approach and algorithms to aggregate guidance content from varying sources and deliver aggregated content through consistent interfaces, and provides an asset and user interface composition model to present the retrieved information following flexible categorization and navigation schemes. Further, the system provides methods to package information assets types and distributes them to product surfaces where these assets are consumed and displayed to the end users. Thus, the product guidance system helps product teams deliver the right information, within the right context, and within the product surface.

This Summary is provided to introduce a selection of concepts in a simplified form that are further described below in the Detailed Description. This Summary is not intended to identify key features or essential features of the

DETAILED DESCRIPTION

Figure 1:
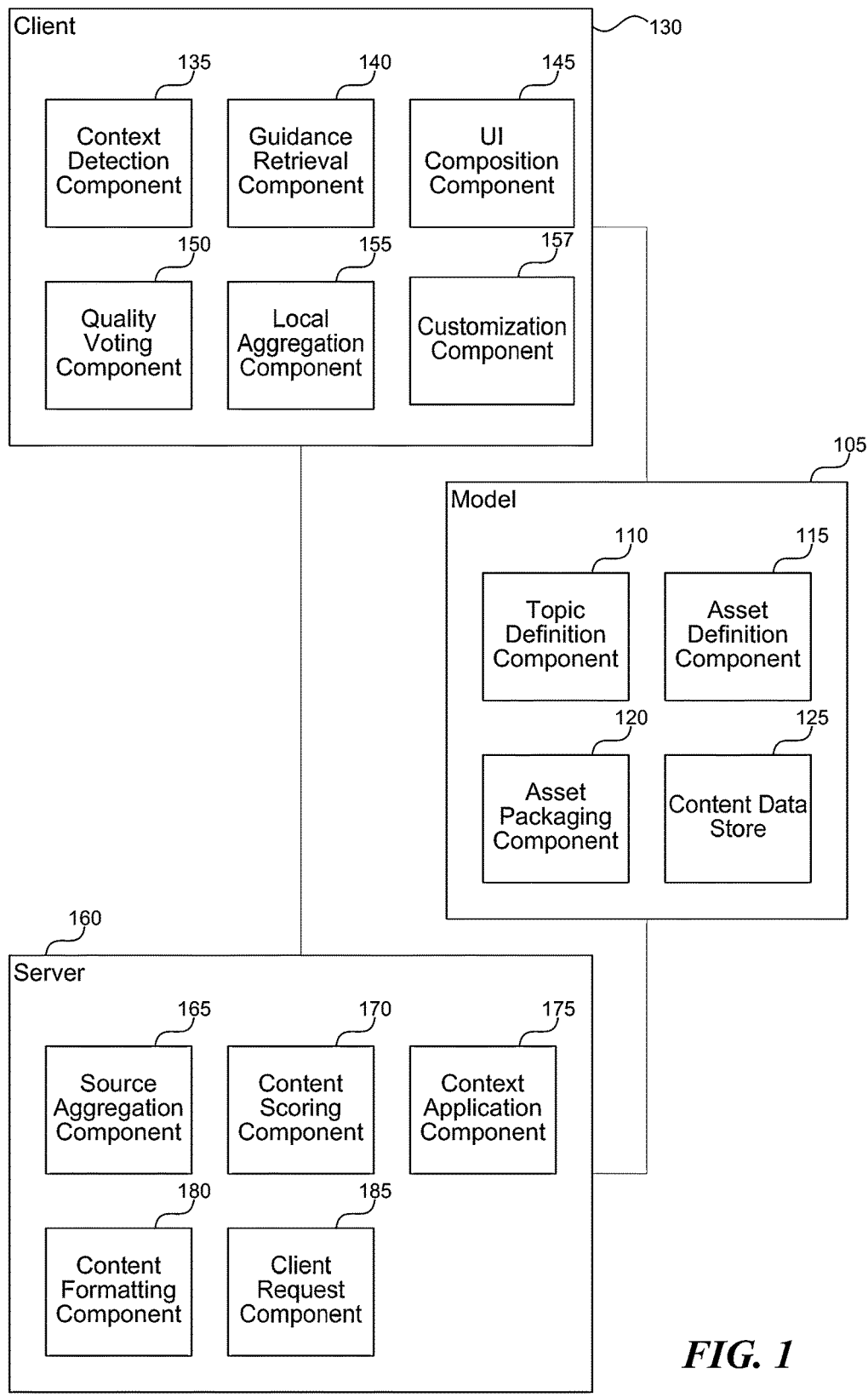
FIG. 1 is a block diagram that illustrates components of the product guidance system, in one embodiment.

Information experience sourcing, delivery models, and consumption have changed over the last decade. Product guidance creation, management, and publication have become increasingly complex. It is imperative that the products used for these functions be designed and implemented to facilitate continual innovation that improves the customer experience and enables product owners to deliver the right information in the right context while maintaining high quality attributes. The influence of online communities in providing guidance experience for software products is increasing. Customers expect guidance delivered within the product. The Web is the source of guidance on recurring issues such as troubleshooting, getting started, scenario driven product documentation, and reusable code. This information is delivered through communities, forums, product documentation, and knowledge articles. However, the information is not collected and presented within the context of the tasks that the end-user is currently performing or the product in which the user may be performing such tasks. The relevancy, reputation, and rating and other quality metrics on the guidance are often assumed and not articulated through proper tools and methods. Additionally, the content is not delivered and presented with the correct context in which it is used. Most software products lack methods to aggregate content guidance on-demand because help sources are hardcoded within the product logic. Coherence and integration are also occurring between products, with the rise of communities and guidance on delivering the right information experience. This complex ecosystem of next generation information experience needs innovative methods, processes, and tools to aggregate, deliver, and consume product guidance.

A product guidance system is described herein that provides consistent methods and processes to aggregate product guidance from different online (and potentially local) sources, to ensure that the guidance aggregation is done with proper quality criteria (e.g., content/author reputation), to define how guidance is aggregated and presented appropriately for the context (e.g., a novice user may see different UI experience and different content than an advanced user), and to specify how the guidance is delivered within the product surface itself. The system addresses the above issues through a consistent method to assimilate the guidance information from various sources and present the guidance information in a consistent fashion for the end user based on their context. The system defines a consistent information asset type meta-model, applies a semantic approach and algorithms to aggregate guidance content from varying sources and deliver aggregated content through consistent interfaces, and provides an asset and user interface composition model to present the retrieved information following flexible categorization and navigation schemes. Further, the system provides methods to package information assets types and distributes them to product surfaces where these assets are consumed and displayed to the end users. Using the system, product teams can create any type of guidance for products such as getting started, troubleshooting, script management, guidance exploration, and product documentation delivery.

As an example, in the second scenario mentioned above, the IT administrator can now use a "PowerShell Script explorer" tool built following the method described herein utilizing the product guidance system. This tool enables him to search for scripts from local and online script repositories. A cloud service aggregates the scripts from various repositories and rates them following algorithmic ranking models. Upon retrieval, he is shown all of the available scripts organized based on category, and script details are presented following the content type model. Additionally, he is also shown guidance information about the script usage, code samples, troubleshooting guidance, and knowledge articles about the scripts. Once he finds the script he needs, he has the option to download and use the script. The organization may include one or more advanced script authors that can be made responsible for creating new scripts and making appropriate changes to other scripts to suit the enterprise's needs. Once verified, these authors upload the changed scripts to communities or a local repository where they are available for anyone in the organization to discover and use. Thus, the product guidance system helps product teams deliver the right information, within the right context, and within the product surface.

The product guidance system provides three major contributions, 1) defining a consistent information asset type meta-model, 2) applying a semantic approach and algorithms to aggregate guidance content from varying sources and deliver them through a consistent interface, and 3) an asset and user interface composition model to present the retrieved information following flexible categorization and navigation schemes based on the context. This method helps guidance authors to create guidance tasks quickly and product teams to build user interface tools to present the guidance results.

The system proposes a method to understand relationships between assets and the context in which such assets are relevant. For example, an IT professional at the evaluation phase of a project relies on different guidance than an IT professional performing deployment. Similarly, an IT professional that has just read a design guide should next be referred to the Deployment Guide. Furthermore, if the IT professional made certain design decisions within the Design Guide, then the Deployment Guide should be optimized with this additional context in mind.

In an example embodiment presented herein, the product guidance system is applied to WINDOWS™ POWERSHELL™ scripts for search, explore, and troubleshooting tasks. However, the same model is applicable to all atomic or composite content types such as getting started, product update information, product extension information, content workflows, and so forth.

The asset type meta-model of the product guidance system provides a data definition schema for defining product information entities and their attributes. The model includes two high-level entity types: information types and information models. The information model entity types provide the structure of a particular topic/asset/asset package and help guide the user through the consumption experience. Information type entity types provide a standardized set of information models that describe the types of assets. This can include asset types, topic types, and asset package types. Asset types are a standardized set of types of assets, and may include narrative-based assets (e.g., Getting Started Guide, Planning Guide, and Deployment Guide) and code-based assets (e.g., Reference Implementation). Topic types are a standardized set of topic types that are used to create narrative-based assets (e.g., How To, Check List, Guidelines, and so forth). Asset package types are a standardized set of asset types that are combined together to support the release of a product. Thus, topics make up assets and assets make up an asset package for a particular product (or suite of products).

Information models are a standardized set of information models that describe how sets of assets relate to each other. Understanding how assets relate to each other helps to guide customers through the consumption of a product's assets. Information models can include asset models and asset package models. An asset model describes how a set of topics within an asset relate to each other. Two example types of asset models are books and processes. Books provide traditional book-like guidance that is organized around a table of contents or similar structure. Processes provide process-oriented guidance (e.g., a SuperFlow or flow chart) that describes a process for navigating guidance. An asset package model describes how assets within an asset package relate to each other. Thus, asset models describe how topics relate within an asset and asset package models describe how assets relate within an asset package.

Consumers retrieve assets based on the current context and present retrieved assets to the end user. The context can be explicit or inferred from a task being executed. Client user interfaces understand the relationship between the assets, and construct user interfaces following composition guidance provided in the model. The client side of the product guidance system provides a task-based/context-influenced guidance composition model. This allows the system to incorporate dynamic help information directly into the product. Relevance of guidance presented is determined primarily by applicability and reputation of the source and secondarily by quality and completeness. In some embodiments, the client side provides an ability to affect reputation and quality metrics (e.g., via voting) from within the tool. Quality can be measured through community input, and completeness can be measured by evaluation against a standard frame that sets expectations for particular content types around completeness. The side also provides front-end content management in which a user can modify content and move it into other portals.

The server side of the product guidance system provides a service for aggregating information from various sources, applying relevance and reputation metrics on the retrieved information, converting the retrieved information to consumable formats, and exposing aggregated information through standardized methods. The service is responsible for building the asset relationship and exposing those through metadata. Clients rely on the exposed metadata to understand the asset types exposed by the service. The service provides a kind of information marketplace, in which information is aggregated from a variety of disparate information sources. The service applies a rule-based aggregation model in which assets are composed based on applicable rules defined using the service. The service also provides algorithms to decide on guidance relevancy and reputation (e.g., based on source, keyword metrics, natural language processing, user voting, editor input, and so forth).

Using the service, product teams can introduce any atomic and composite content types quickly following the information meta-model. The product team can also introduce new user interface presentation logic to present the content types at the client. Product information provided to the client is context-influenced guidance content, meaning that the activity ongoing at the client can influence the content presented. Content presented is also filtered based on quality scoring of the content, so that dynamic content makes it quickly to users after fast, automated review. The services allows users to receive dynamic help from within any product surface, and users can affect content quality by providing input back to the service through the client application.

As described herein, the product guidance system provides a service framework that enables aggregation of content from various repositories following a set of aggregation rules and asset type information meta-model and a client-side user interface composition model for displaying content types. An example solution that leverages the system is built for the WINDOWS™ POWERSHELL™ Integrated Scripting Environment (ISE) product. Scripters want the ability to easily find existing PowerShell scripts. The method described is generic and could be applied to any atomic and composite content type scenario, and is not limited by this example. From the service side, guidance services are modeled following the information meta-model, which describes atomic asset types or composite types. A Web service aggregates content from different sources based on context and filter criteria. An administrator configures service operational behavior using the aggregation rules. As an example, the administrator might define MICROSOFT™ TechNet and a third party website as information sources, and provide rules for extracting content according to the formats of those sources. The service then exposes metadata to clients to create the user interfaces associated with the information found. For example, the system may apply Hypertext Markup Language (HTML) or other user interface definition languages to layout the content in a manner that the client can display the content (even if the content changes over time). The client relies somewhat generically on asset types and model definitions that allow the client to act as a viewing tool for whatever content the server is able to find and provide.

On the client side, the client looks for the exposed service metadata. For example, the service may provide methods for searching or browsing available scripts using keywords. A product team constructs user interface models at the client for displaying appropriate content types. The models may be generic enough to allow new information to be added in the future while still fitting within the model of information types that the client is designed to display. The product team also creates a composition model to define how various user interface elements work together and interact with each other. This composition model is extensible to add new task guidance types with components needed for the visual representation of the content types.

The information meta-model defined may include various guidance tasks. Guidance tasks are tasks performed by the end user to get specific help on a topic or subject. These tasks retrieve intelligent content appropriate for the context. For example, a novice scripter can perform a task to search for WINDOWS™ POWERSHELL™ scripts from online and enterprise repositories. Another novice scripter may request guidance on getting started using WINDOWS™ POWERSHELL™. The meta-model also includes a content model that defines a data model to support complex content types, such as guides (hierarchical), SuperFlows (process oriented), scripts (lists), and taxonomies. SuperFlows are a type of help information like an interactive flow chart. Each SuperFlow includes comprehensive information about a specific dataflow, workflow, or process. Depending on the focus of the SuperFlow, it may include overview information, steps that include detailed information, procedures, sample log entries, best practices, real-world scenarios, troubleshooting information, security information, animations, or other information. Each SuperFlow may also include links to relevant resources, such as Web sites or local files that are copied to a user's computer when the user installs the SuperFlow.

The information meta-model may include a guidance composition meta-model (GCM) that specifies how a specific guidance task (e.g., script explore, script search, getting started, script troubleshooting) is defined and presented at the client. This meta-model includes the appropriate content model for the task, applied context, services to be invoked, scoping, and user interface regions within the application to present the guidance topics. An instance of this meta-model drives the application user interface composition and behavior. An application shell loads this meta-model and construct the UI elements. This provides the flexibility to create new instances of composition meta-model, package and distribute.

The information meta-model includes an aggregation data model (ADM) that defines how guidance information is aggregated from different content sources, organized, mapped, and shared. ADM represents a set of guidance resources exposed (e.g., scripts, categories, wiki toc, and How-To) and a resource schema. Additionally, this model specifies a number of data sources and a set of associated transformational patterns to normalize data into a consistent format for delivery on a particular protocol Those of ordinary skill in the art will recognize numerous applicable patterns for extracting and formatting data from various sources into a common format for standardized consumption.

Product teams and customers can create and customize guidance tasks in a consistent way following the user interface composition method. These are organized as guidance tasks. Some examples of these tasks are "search for PowerShell script", "getting started on PowerShell", "troubleshooting on PowerShell execution error", or "content ToC workflow". A meta-model is defined to capture information such as content model, context in which the action is performed, services to be invoked to retrieve the guidance content, the task navigation strategies, and the action results. Applications use these meta-model instances to bootstrap the application and associated look and feel. This meta-model provides a content model (e.g., hierarchical search), a context in which the action is going to be performed (e.g., novice user is performing this task), how the guidance content is displayed and viewed for the specific action (e.g., whether the task execution needs a navigation region, results region, and details region), and services to be invoked to get guidance content on the action/topic.

Once this meta-model is interpreted for an instance, based on an action the user is performing (e.g., search vs. troubleshooting), the system will construct/present suitable guidance views. For example, if a user is performing a troubleshooting task, the meta-model instance for troubleshooting may contain the following:

Content model—Troubleshooting
Context—Novice user
Service—Aggregation service for knowledge base articles user interface composition regions needed—search pane (navigation pane), articles list pane (content type pane), and details view (content details pane)

The composition model can be defined in extensible markup language (XML) as follows:

```
?xml version="1.0" encoding="utf-8"?>
<Composition Model
xmlns="http://schemas.microsoft.com/IX/2011/03/
GuidanceComposition">
   <Tasks>
      <Task Name="Search" Default="true" DisplayName="Search"
Icon="pack://application:,,,/Microsoft.iX.ScriptExplorer.-
CoreModule;component/Resources/Search.png">
         <Task.Services>
            <ServiceReference Value="{x:Reference
Name=SearchManagerService}"/>
         </Task.Services>
         <Views>
            <View
Class="Microsoft.iX.ScriptExplorer.Views.SearchScriptView"
Region="NavigationRegion"
Context="UserGroup=*;ApplicationType=Standalone"/>
            <View
Class="Microsoft.iX.ScriptExplorer.Views.ResultsScriptView"
Region="ResultsRegion" Context="UserGroup=*;ApplicationType=
Standalone"/>
      </Task>
   </Tasks>
</CompositionModel>
```

An aggregation service model is defined for aggregating content from different guidance sources. Content types are retrieved from various sources such as TechNet content, MSDN articles, Forums, knowledge bases, Wiki, TechNet Script Center, and other external repositories. This model specifies a resource schema (input/output data models) and behavior about how the data is aggregated, mapped, and shared. Behavior definition includes: services to be contacted to get the content, data mapping/transformation from service specific to common schema, and constrained scope definition on content search. Additionally the service implements algorithms to enable proper aggregation of content based on ownership, reputation, and relevance. New tasks and content types can be created following this pattern. An example XML definition follows:

```
<adm>
   <resources>
      <resource resourceSet="Categories" name="Category" clrType=" "
key="" informationResourceType="EntityType" namespace=" ">
         <pre-processor> ... </pre-processor>
```

-continued

```
    <post-processor> ... </post-processor>
    <repositories>
        <repository name="Category" displayName="TechNet Script Center" type=" " >
            <mapping name="TRESTMapper" type="Sample.xslt or a code provider"> </mapping>
        </repository>
    </repositories>
</resource>
<resource resourceSet="Scripts" name="Script" clrType=""
key="ScriptId" informationResourceType="EntityType"
namespace="AggregationServiceProvider">
    <repositories>
        <repository name="WebLocalFileSystem" ..../>
        <repository name="WebTechNet" displayName="Web TechNet Script Center" ..../>
    </repositories>
</resource>
</resources>
</adm>
```

FIG. 1 is a block diagram that illustrates components of the product guidance system, in one embodiment. The system includes a data model 105, a client 130, and server 160. The data model 105 includes a topic definition component 110, an asset definition component 115, an asset packaging component 120, and a content data store 125. Although shown separately, the data model 105 may operate at the client 130, server 160, or both. The data model 105 may also include a separate server or database. The client 130 includes a context detection component 135, a guidance retrieval component 140, a UI composition component 145, a quality voting component 150, a local aggregation component 155, and a customization component 157. The server 160 includes a source aggregation component 165, a content scoring component 170, a context application component 175, a content formatting component 180, and a client request component 185. Each of these components is described in further detail herein.

The data model 105 includes software components and data definitions that allow the client 130 and server 160 to communicate and understand a generic, standard model for software guidance information. The model 105 defines the available types of help information, how they can be requested, as well as how they can be displayed and/or viewed.

The topic definition component 110 receives information describing a topic related to product guidance from a guidance author. The system may provide web-based, mobile, desktop, or other tools through which guidance authors can author or upload already authored guidance content. The topic definition component 110 receives topic definitions that identify individual topics that a user of a software product can access. The topic definition component 110 may receive a variety of types of information including textual, video, audio, flow charts, graphs, or any other type of information. The information may also include formatting such as color, emphasis (e.g., bold and italics), numbering, bullets, or other information that can be used to format the topic when it is displayed at the client 130. The topic definition component 110 provides methods for creating topic types in the meta-model described herein.

The asset definition component 115 receives information that groups one or more defined topics into a guidance asset. An asset author uses the authoring tools of the system to provide information describing how topics are related and how the topics are presented (e.g., ordering, entry points, and so forth). Assets can include many types of data and relationships between data, such as any of the topic types previously described, as well as code-based assets (e.g., scripts, sample code, and so on) and narrative assets. The asset definition component 115 provides methods for creating asset types in the meta-model described herein.

The asset packaging component 120 receives information that defines a group of assets that are related to a particular software product, wherein the group of assets comprises an asset package. The asset package defines the available guidance information for the software product. This includes all of the traditional types of guidance information available for products, as well as dynamically discovered and aggregated guidance data identified by the system. A guidance author may define asset packages using one or more authoring tools or user interfaces provided by the system. The asset packaging component 120 provides methods for creating asset package types in the meta-model described herein.

The content data store 125 stores defined topics, assets, and packages for delivery by the server 160 to the client 130 upon receiving a request for guidance information. The content data store 125 may include one or more files, file systems, hard drives, storage area networks, databases, cloud-based storage services, or other facilities for storing data. For example, the content data store 125 may include XML definitions of guidance information that can be provided to a client for consumption and display to an end user. The content data store 125 may reside separately on a computer system or may be co-located with the client 130 or server 160. Those of ordinary skill in the art will recognize numerous configurations and optimizations that will allow the system to function as described herein and meet various design goals for access of guidance content (e.g., latency, network cost, security, globalization, and so forth).

The client 130 is the computer system located with the end user and provides the end user's main interface into the product guidance system. The client 130 may include a desktop computer, laptop computer, mobile device, or any other computing device through which the end user can access guidance data.

The context detection component 135 detects a context that describes information related to a task an end user is currently performing within a software product. The context may include detecting where in the product the user is currently interacting (e.g., a particular menu item, user interface, wizard page, and so forth), a goal of the user's current actions (e.g., find a script for restarting a computer), or any other context information that a particular implementer of the system would like to capture at the client. The context may also include information about the user, such as demographic information, the user's skill level with the product, how long the user has used the product, past history of the user's actions with the product, and so forth.

The guidance retrieval component 140 requests guidance information from the server 160 and provides the detected context from the client 130. The guidance retrieval component 140 may use any common or proprietary protocols for retrieving content, such as HTTP requests. The guidance retrieval component 140 receives guidance content from the server in an agreed upon format, which can be XML or any other format that both the client and server understand. The guidance information may indicate available guidance tasks (e.g., searching, browsing, and so forth) or may be focused on a particular guidance asset that has been identified in response to a specific request (e.g., a how to article for performing a particular action). The guidance information may also include information for displaying the content, such as markup or other metadata.

The UI composition component 145 determines how to display received guidance content and displays the guidance content to the end user. The guidance content may include display information, such as markup or other indications. In some implementations, the client determines how to display content based on model and type information provided in the guidance information. For example, the client may be designed to display "how to" content in a particular manner. The UI composition component 145 may also map guidance content to particular regions of a display (e.g., windows) designated for particular types of content. For example, the client 130 may provide a category view, search results view, and a detail view that are each populated with content received from the server 160.

The quality voting component 150 receives feedback from the end user related to the quality of the received guidance content. The feedback may include simple controls like a "like" or "dislike" button, a 5-star or similar system, or advanced survey information including freeform text boxes for receiving feedback from the user. The quality voting component 150 provides the received feedback to the server 160 so that the system can ultimately provide feedback to the guidance author for improving the guidance content. The quality voting component 150 is part of a feedback loop that allows content to improve over time by making authors aware of the reaction of their users to the content.

The local aggregation component 155 optionally aggregates data from multiple sources at the client 130. Typically, a separate server 160 will aggregate disparate sources of guidance data (e.g., online forums, knowledge base articles, and so forth). However, in some cases the client 130 may contain interesting guidance data, such as previously downloaded guidance content, information created by the end user (e.g., scripts or sample code), and so on. The system may want to present this information alongside other discovered guidance information, and the local aggregation component 155 allows the system to discover and integrate such content into search results or other guidance output.

The customization component 157 enables the user to customize guidance content received from the server and to save the guidance content locally on the client. Saving the content locally allows longer-term use with appropriate rating information and can allow the user to use the guidance content even when the client computer system is offline or cannot connect to the content data store 125.

The server 160 provides a centralized location for collecting guidance content from various data sources and providing that content upon request to one or more clients (e.g., client 130). In some cases the server 160 may be the same computing system as the client 130 so that all of the aggregation, searching, and use of the model is applied at the client, but this is an implementation choice that can be varied to suit particular design goals of users of the system.

The source aggregation component 165 gathers guidance data from one or more specified dynamic guidance data sources. Dynamic guidance data sources are those sources that provide new product information after a product is released to consumers, and may include online forums, knowledge base articles, newly authored help content from the product team, blog posts, or any other type of guidance content. An operator of the system can identify one or more sources of content and configure the system to periodically retrieve new content from each source. The source aggregation component 165 gathers this content, maps the information to the applicable guidance model defined by a guidance author, and stores the information in a format that adheres to the model for providing in response to client requests.

The content scoring component 170 provides an automated determination of one or more quality metrics of gathered guidance data. The quality metrics may include relevance and reputation information determined based on the source of the data, the content (e.g., through keyword analysis or natural language processing), user voting, editor classification, and so forth. The content scoring component 170 provides a gateway to vet incoming content against a quality bar and to avoid content that may include spam, be offensive, or be irrelevant or unhelpful.

The context application component 175 applies one or more contextual filters to incoming content to determine one or more client contexts for which the content is a match. For example, the component 175 may identify the content as being for novice users, advanced users, users of particular products or product versions, and so forth. Context that is relevant to any particular implementation of the system can vary, and the implementer can determine what context to identify and classify for incoming guidance data.

The content formatting component 180 applies one or more formatting rules to gathered guidance data to provide metadata to clients related to how content can be displayed. The content formatting component 180 may remove unsupported formatting information (e.g., from data gathered from the web) and convert the formatting to a format expected and understood by the client 130. The formatting may include markup or other metadata that supplements guidance content with formatting information retrievable by the client.

The client request component 185 listens for and responds to client requests for guidance data from the server 160. The client request component 185 may listen on one or more supported protocols, such as Hypertext Transport Protocol (HTTP), a proprietary protocol, mobile device protocols, and so forth. The client request component 185 receives any client-provided context information, identifies suitable content from the gathered guidance content, and sends the guidance content with any formatting information to the client 130 for display to the end user. The client request component 185 may also detect a type of client 130 (e.g., a mobile device) and provide content suitable for that device.

The computing device on which the product guidance system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored on computer-readable storage media. Any computer-readable media claimed herein include only those media falling within statutorily patentable categories. The system may also include one or more communication links over which data can be transmitted. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
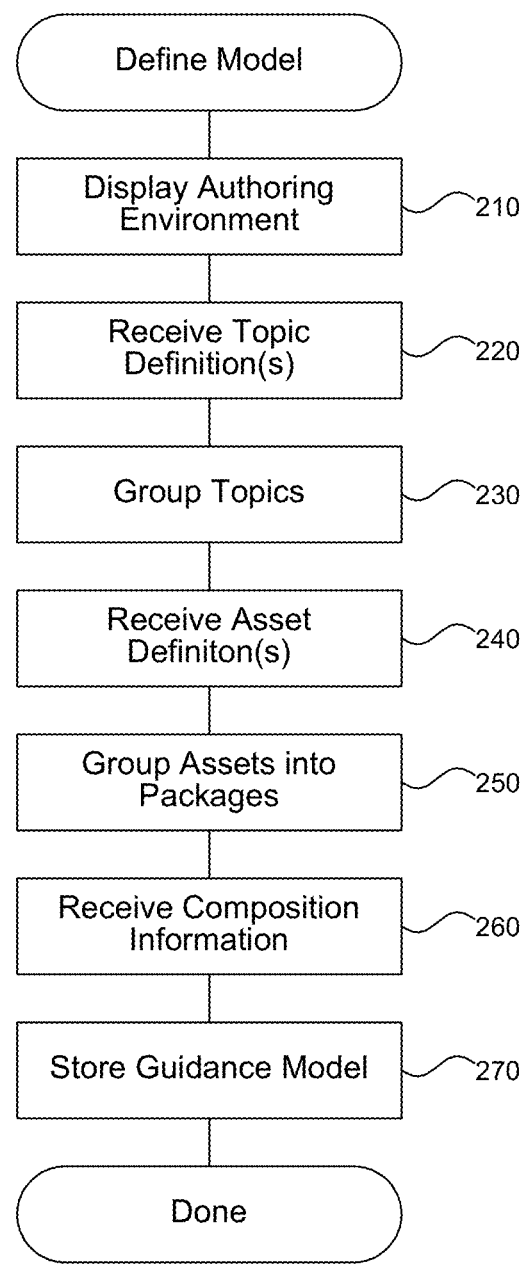
FIG. 2 is a flow diagram that illustrates processing of the product guidance system to define a product guidance model for a particular software product, in one embodiment.

FIG. 2 is a flow diagram that illustrates processing of the product guidance system to define a product guidance model for a particular software product, in one embodiment.

Beginning in block 210, the system displays an authoring environment to a guidance author for defining a guidance content model. The authoring environment may include one or more web pages, applications, programmatic APIs, or other tools for providing authoring data to the system. The authoring environment may display a user interface or receive programmatic data from third party interfaces for authoring guidance content. The environment may receive a variety of types of guidance content, including textual, video, audio, code, and so forth. The environment may also allow an author to match existing content to a predefined guidance model so that the existing content can be exposed in accordance with the model.

Continuing in block 220, the system receives one or more topic definitions that define individual guidance topics for which an end user can receive information. A guidance topic may include a body of text (e.g., an article), a flow diagram, a code snippet, or any other basic building block of guidance information. Guidance information can include any information that helps the end user use the software product or accomplish a task using the product.

Continuing in block 230, the system groups the received topic definitions into related segments. The system may automatically group the topics and/or may receive grouping information from the guidance author. In some cases, topic information may come in from various data sources but may be grouped together into related categories or tasks with which the content is most closely associated. For example, for a particular task, one website may provide a good description of the problem, another may provide good illustrations of the solution, and a third may provide sample code for carrying out the solution.

Continuing in block 240, the system receives one or more asset definitions based on the grouped topic definitions. An asset definition includes one or more topics and additional metadata related to the topics. For example, the asset definition may include context information that defines situations in which the asset will be used, composition information that defines how the asset will be displayed, version information that defines which product versions the asset applies to, and so forth.

Continuing in block 250, the system groups the received asset definitions to define a package of assets. An asset package represents all of the types of guidance content available for a particular software product. The system may group assets automatically based on product information specified in the asset definitions and/or may receive guidance author input to create asset packages.

Continuing in block 260, the system receives a guidance composition model that defines how assets within the defined package will be displayed by a client. The composition model may include display regions within a larger user interface to reserve for content, where content associated with each type of topic and asset is to be displayed, formatting of content within each topic, and so on. The composition information can provide varying degrees of client flexibility depending on the needs of a particular implementation of the system. In some cases, the client will be designed to provide a rich experience based on types provided by the server, and in other cases, the client might act simply as a browser that displays content in a way predetermined by the server.

Continuing in block 270, the system stores a guidance model that includes the defined topics, assets, asset package, and composition model. The system stores the model in a data store accessible from the client and the server, so that the client and server can communicate guidance information that adheres to the model. The guidance content is updateable with new information to the extent that the new information can conform to the model. The client can rely on all guidance content following the model and can display new guidance content provided by the server that adheres to the model. After block 270, these steps conclude.

Figure 3:
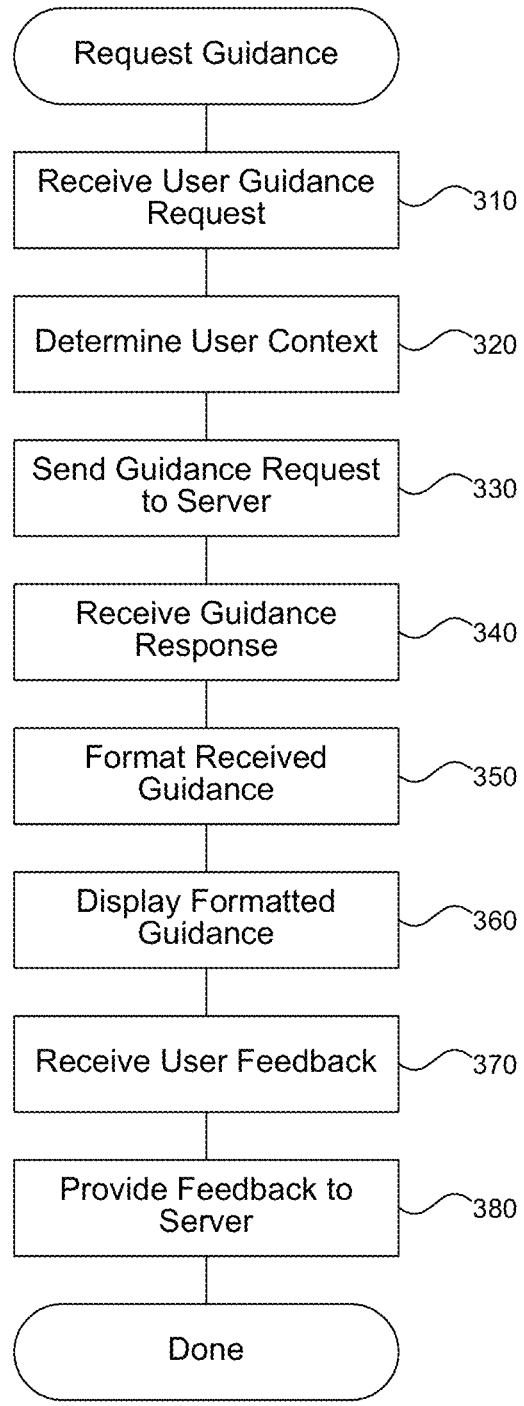
FIG. 3 is a flow diagram that illustrates processing of the product guidance system to request software product help information in accordance with a guidance information model from a client, in one embodiment.

FIG. 3 is a flow diagram that illustrates processing of the product guidance system to request at a client software product help information in accordance with a guidance information model, in one embodiment.

Beginning in block 310, the system receives a request from a user of a software product to display guidance related to using the software product. The guidance request may come from a number of entry points within the application, such as the user entering a search in a help query area, the user pressing a help control (e.g., F1 help), the product automatically noticing the user is performing a task, and so forth.

Continuing in block 320, the system determines context information associated with the received request that identifies one or more qualities related to the user or a current task the user is performing. The context information may relate to where in the software product the user is currently located, what activity the user is performing, particular data the user is operating on, and so forth. The context information may also include information specific to the user, such as the user's skill level, experience with the software product, age, special needs of the user (e.g., preference for audio rather than visual content), and so on.

Continuing in block 330, the system sends a guidance request to a server that aggregates updated guidance information from one or more guidance data sources, wherein the request includes the determined context information so that the server can provide context-sensitive guidance. The server may include a server process running on the same computer system as the client or a central server accessible by multiple clients. The guidance request may be sent using a variety of protocols, including HTTP, TCP, or a proprietary protocol. In some embodiments, the system provides a protocol based on representational state transfer (REST) principles with well-defined action verbs and parameters that can be used by clients or third party services.

Continuing in block 340, the system receives a guidance response from the server that includes guidance information specific to the determined context and composition information for displaying the guidance. The received guidance adheres to a guidance information model agreed upon by the client and server. In other words, the client and server are designed to consume and provide (respectively) content in the form specified by the guidance information model. In some embodiments, for increased flexibility this guidance agreement between client and server could be negotiated dynamically through metadata exchanges. The server dynamically updates available guidance information but maintains new and old information in accordance with the model so that the client is assured of being able to display the information. In some embodiments, the client also aggregates guidance data and combines local guidance results with guidance information received inform the server.

Continuing in block 350, the system formats the received guidance information according to composition information contained in the guidance response and format information associated with the guidance information model. In some embodiments, the system maps specific topic and asset types with particular formatting attributes, so that topics or assets of a particular type are each displayed in a similar way. The formatting may include areas of the display where particular topics are allowed to paint data, and may include markup or other metadata and hints from the server about how to display guidance content.

Continuing in block 360, the system displays the formatted guidance information to the user to help the user accomplish the current task. The system may display guidance information in a separate window alongside the software product or may integrate the guidance information within the software product (e.g., in a related window, in a pop up dialog box, as tooltips or other context sensitive guidance, and so forth).

Continuing in block 370, the system optionally receives user feedback related to the quality of the guidance. The user may provide a vote of indicating how useful the content was to the user, whether the content had errors, whether the user found the content to solve a particular problem, and so forth. Because the system aggregates guidance content from a variety of sources, the system values information indicating how reliable those sources are and how reliable particular content from those sources is. Using this information, the system can eliminate unhelpful or low quality content and can surface higher quality content.

Continuing in block 380, the system provides the received user feedback to the server. For example, the system may send the feedback to the server using a similar protocol to that used for submitting guidance requests. The system may send individual feedback or may gather and send batches of user feedback over time. In some cases, the system may observe user behavior over time and provide information to the server related to whether the guidance information helped the user complete a task. In some embodiments, the system allows the user to save the content or guidance locally or to the enterprise for later use. Also, in some cases the end user can modify the content if allowed and stored as a new version locally. This helps support offline access and other scenarios. After block 380, these steps conclude.

Figure 4:
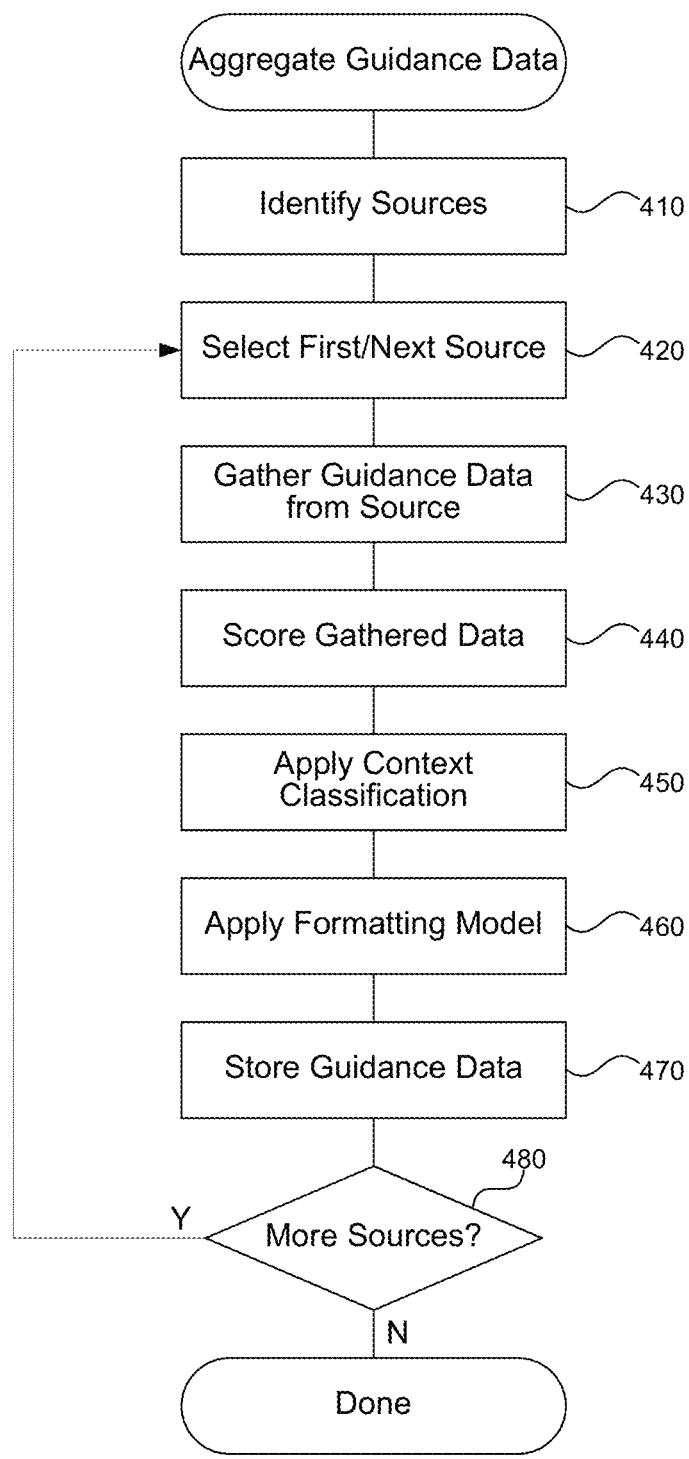
FIG. 4 is a flow diagram that illustrates processing of the product guidance system to aggregate guidance data from multiple guidance data sources at a server, in one embodiment.

FIG. 4 is a flow diagram that illustrates processing of the product guidance system to aggregate guidance data from multiple guidance data sources at a server, in one embodiment.

Beginning in block 410, the system identifies one or more sources of guidance data for providing help using a software product. The sources may be preconfigured, such as a known list of sources of guidance data (e.g., wiki sites, how to sites, knowledge bases, magazine sites containing articles, technical sites from the product manufacturer, and so forth). The sources may also be newly discovered, such as through periodic searching or crawling of the Internet or other data sources or based on user recommendation. For example, the system may automatically identify a growing community devoted to a particular software product.

Continuing in block 420, the system selects the first source from the identified sources to perform the following steps. Upon reaching this block in subsequent iterations, the system selects the next data source and performs the following steps. Although shown serially, those of ordinary skill in the art will appreciate that these steps may be performed in parallel for multiple sources at a time to increase efficiency. The system may also use a distributed approach in which different servers handle gathering data from different data sources.

Continuing in block 430, the system gathers guidance data from the selected data source. The system may store a cursor, time stamp, or other indicator to differentiate information that the system has previously gathered from new information that has been added to the data source subsequent to the last gathering of data. The system aggregates new data into the data available for clients to retrieve. During data gathering, the system may download content as a whole or may store links to the data source so that the content can be retrieved upon request. Downloading the content ensures that the content will be available in the future but consumes more storage of the system.

Continuing in block 440, the system scores gathered guidance data to determine a quality of the gathered guidance data. Dynamically gathered content may have little to no editorial control, and the quality of the content may vary widely. In addition, the data may contain spam, obscenities, or other undesirable content. The system scores the content to separate high quality content from low quality content. The system may set a threshold of quality below which content is simply dropped and not incorporated into the guidance model exposed to clients. In other cases, the system may flag content for additional editorial review either before or after exposing the guidance to clients.

Continuing in block 450, the system applies context classification to match gathered guidance data to one or more potential contexts of clients that may request the data. As one example, context may include expertise of an end user and categorizing content as suitable for an expert, novice, or any skill level in between. Context can include any information that an implementer of the system chooses for his/her particular design goals and instance of the system. For some products, context may include age groups and the system may classify content suitable for children different from content suitable for adults. These are just some examples of the variety of potential information that can be used to classify guidance data by context.

Continuing in block 460, the system applies a formatting model to convert the gathered guidance data from a source format to a guidance composition model shared with clients. The system may add markup language or modify markup found in the source format to conform the content to a format that clients are designed to consume. For example, the system may attempt to extract a content summary and provide a summary and detail view for each guidance topic or asset that the client can display in various situations (e.g., displaying the summary in search results and the detail view upon selection of a result). The system can apply any formatting data useful for a particular instance of the system.

Continuing in block 470, the system stores the gathered guidance data, quality score, context classification, and formatting in a data store for later retrieval by one or more clients. The system may store the data in a database, as XML or other files in a file system, or in another suitable data storage format. The system gathers data periodically from each data source to keep up to date product guidance information available for clients. The clients can use this information in a manner that is integrated with normal workflows that use the software product, and benefits from some level of editorial filtering to ensure that content is of suitable quality and usefulness.

Continuing in decision block 480, if there are more sources available for guidance data, then the system loops to block 420 to select the next available source, else the system completes. After block 480, these steps conclude.

Figure 5:
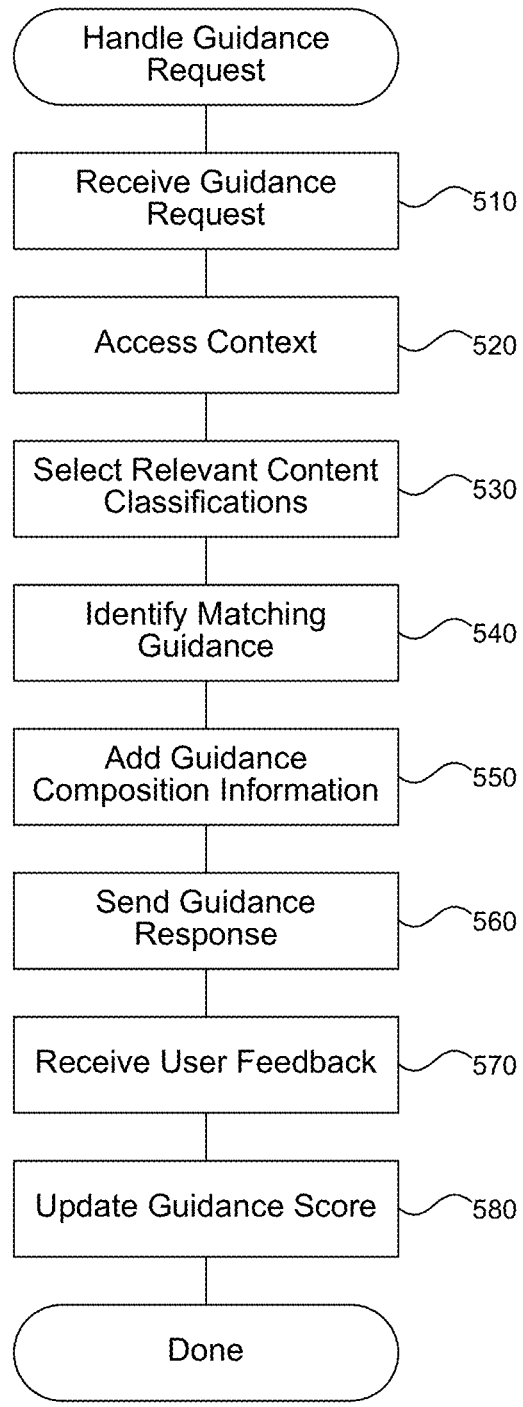
FIG. 5 is a flow diagram that illustrates processing of the product guidance system to handle a guidance request for software product help information from a client received at a server, in one embodiment.

FIG. 5 is a flow diagram that illustrates processing of the product guidance system to handle a guidance request for software product help information from a client received at a server, in one embodiment.

Beginning in block 510, the system receives at a server a request for guidance information related to using the software product. The request may include information such as an identity of the client, context information related to the request, the type of information requested, and so forth. The server may listen at a well-known port using one or more standard or proprietary protocols to receive client requests.

Continuing in block 520, the system accesses context information associated with the received request. The context information provides an indication of content that will match the request based on one or more criteria specific to the requesting user. For example, the context may indicate the user's skill level, a task the user was performing at the time of the guidance request, and so on. The system may extract the context information from the received request, from user profile information, or from other sources available to the system.

Continuing in block 530, the system selects one or more relevant content classifications that match the received request and context information. For example, if the context indicates that the user is a novice user and the server classifies guidance information by skill level, then the system selects a content classification associated with novice users. This allows the system to exclude content that is not relevant for the requesting user and thus to elevate the visibility of search results that are relevant to the requesting user.

Continuing in block 540, the system identifies guidance information stored in a guidance data store that matches the selected content classification based on the received request. The system may conduct a search of a content index or another type of search to identify guidance information previously aggregated by the server. The system may identify multiple potentially matching instances of guidance information, and optionally rank the instances by relevance to the request or other criteria. In this way, the system can present multiple results to the user related to the user's request, so that the user has a good chance of receiving relevant information to complete the user's current task.

Continuing in block 550, the system identifies guidance composition information that describes how to render the identified guidance information. In some embodiments, the guidance composition information is part of a guidance composition model for which the client and server are designed to format and display guidance content. For example, the server may agree to provide guidance content in a predefined format that the client understands how to display. The guidance composition model may include a mapping of guidance asset data types to particular rendering strategies (e.g., rendering how to articles in a particular manner, sample scripts in another manner, and so forth).

Continuing in block 560, the system sends a guidance response from the server to a requesting client that includes the identified guidance information and guidance composition information. The system may respond using client identifying information received in the request. The response may include context-aware guidance information tailored to the requesting user's provided context information. The guidance response may include a payload that is the guidance content (e.g., in markup language or other format) as well as links to external content that the client can retrieve directly.

Continuing in block 570, the system optionally receives feedback from the requesting user that indicates a quality level of the identified guidance information. The system may allow end users to provide feedback so that system operators can improve the information provided by the system and can identify information that is less helpful. The feedback may include a score, textual feedback, or other information that describes quality of the information.

Continuing in block 580, the system updates a quality score associated with the identified guidance information based on the received feedback. In some embodiments, the system automatically determines a baseline quality score upon identifying new guidance content and modifies the baseline score based on feedback received from end users that view the guidance content. After block 580, these steps conclude.

Figure 6:
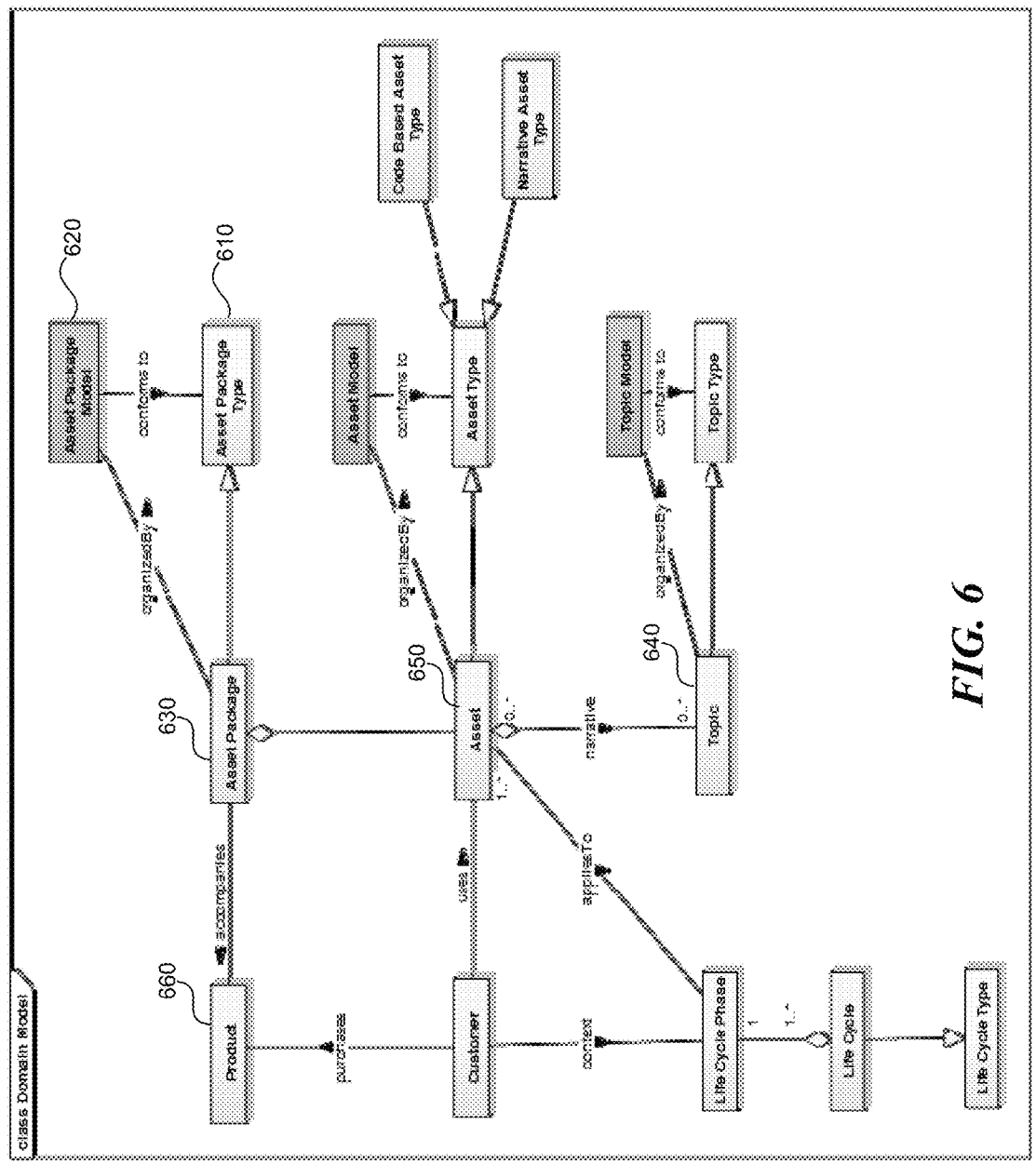
FIG. 6 is a block diagram that illustrates the asset type meta-model of the product guidance system, in one embodiment.

FIG. 6 is a block diagram that illustrates the asset type meta-model of the product guidance system, in one embodiment. The meta-model includes one or more data types, such as the asset package type 610 that conforms to a guidance model, such as the asset package model 620. A particular implementation of the system includes instances of the data types, such as asset package 630. As described herein, topics 640 are grouped into to assets 650, which are further grouped into an asset package 630. The asset package 630 is associated with a product 660 to which the guidance in the asset package applies.

Figure 7:
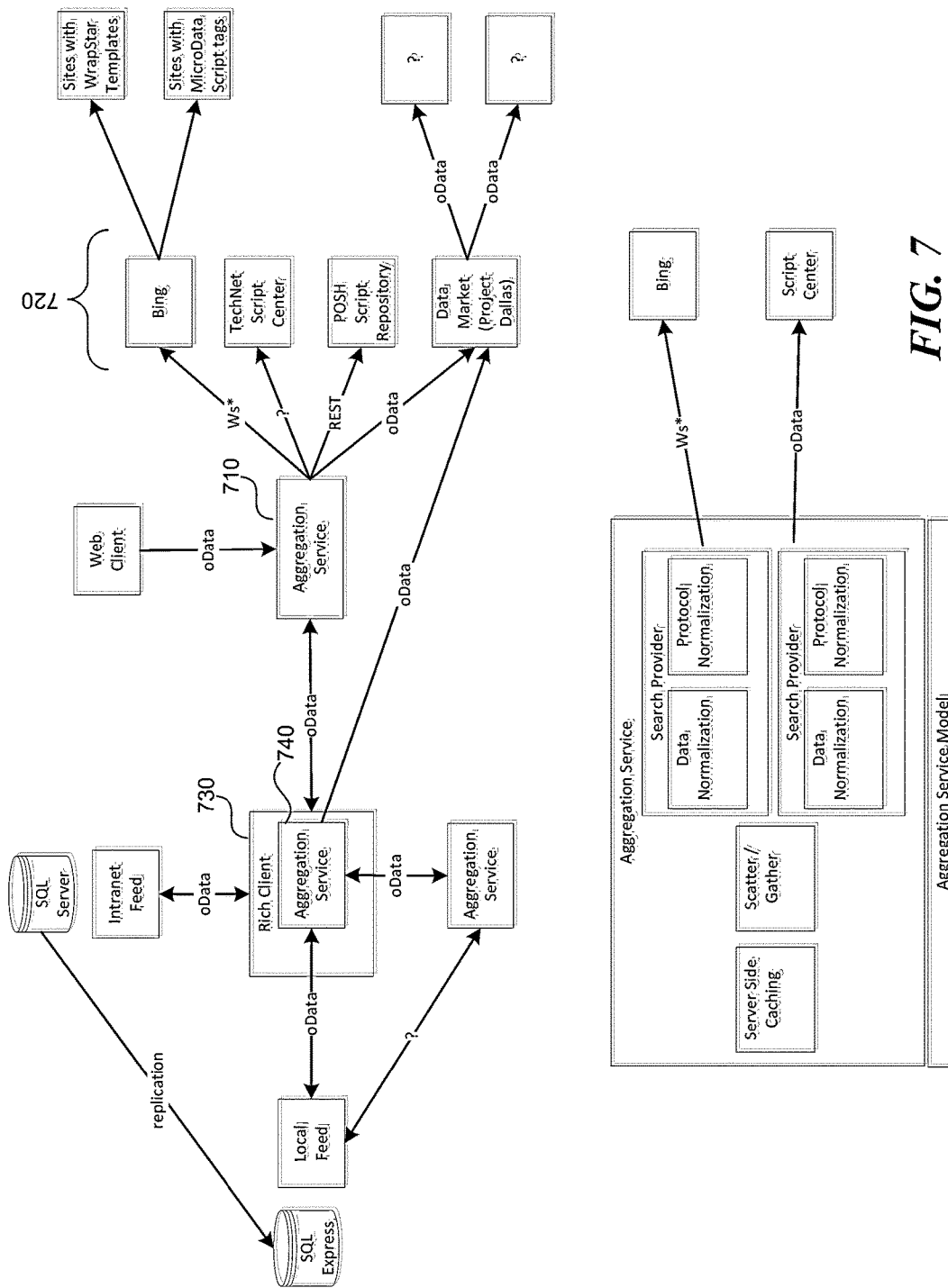
FIG. 7 is a block diagram that illustrates a deployment model of the aggregation services of the product guidance system, in one embodiment.

FIG. 7 is a block diagram that illustrates a deployment model of the aggregation services of the product guidance system, in one embodiment. The product guidance system can aggregate data at various locations, including at a server and at a client as described herein. A server-based aggregation service 710 may gather data from a variety of data sources 720 using a variety of data protocols. A client 730 may receive aggregated guidance data from the server-based aggregation service 710 and may include its own local aggregation service 740 that incorporates local and/or remote guidance data sources into guidance results presented in response to requests.

Figure 8:
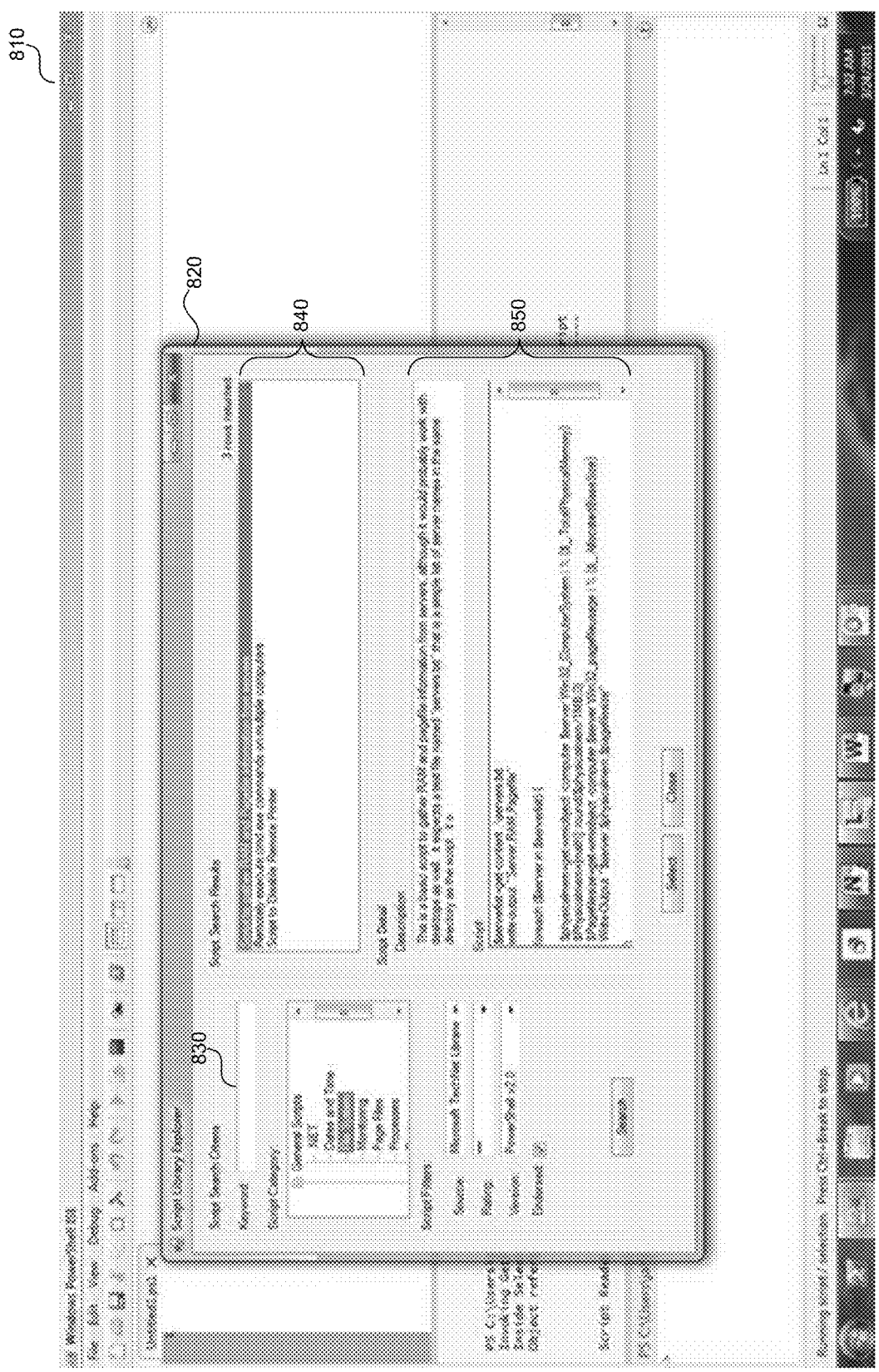
FIG. 8 is a display diagram that illustrates incorporation of the product guidance system into a software product, in one embodiment.

FIG. 8 is a display diagram that illustrates incorporation of the product guidance system into a software product, in one embodiment. A client application includes a main user interface window 810 that includes a script library explorer interface 820 for searching for scripts applicable to an application user's current task. The interface 820 receives one or more keywords in text box 830 related to a guidance search query. The application submits the request to a server or other computer system that aggregates guidance information from multiple sources, and then the application presents the results in the search results area 840 and detail view 850. The server provides data in a format that the application knows how to compose to fit into the available user interface regions. Thus, the user is able to receive up to data help information from a variety of sources.

In some embodiments, the product guidance system provides a facility through which end users can publish their own guidance information into the system for themselves and other users to use in the future. For example, a user that has authored a particular script can use the system to share the script and information about the script with other users. Other users looking for a similar script or help related to the script will find the published guidance information from the first user.

In some embodiments, the product guidance system operates largely at the client without a separate dedicated server. Although server facilities are described herein, the client and server can be combined to provide the functions of both from the same computer system. Thus, the client may reach out to various data sources to aggregate guidance data and then may provide that data in response to requests from applications running on the client.

From the foregoing, it will be appreciated that specific embodiments of the product guidance system have been described herein for purposes of illustration, but that various modifications may be made without deviating from the spirit and scope of the invention. Accordingly, the invention is not limited except as by the appended claims.

We claim:

1. A computer-implemented method to request at a client software product help information, the method comprising:
receiving at the client a request from a user of a software product to display guidance related to a current task the user is performing using the software product;
determining at the client context information associated with the received request that identifies one or more qualities related to the user or the current task the user is performing, determining context information comprising determining information specific to the user, including at least one of the user's skill level, experience with the software product, age, and special needs of the user;
sending from the client a guidance request to a server that aggregates updated guidance information from a plurality of disparate guidance data sources, at least one of the plurality of disparate guidance data sources having a guidance information format that is different from another of the plurality of disparate guidance data sources, the request including the determined context information so that the server can provide context-sensitive guidance;
receiving a guidance response from the server that includes guidance information specific to the determined context and composition information for displaying the received guidance information, the received guidance information related to the current task the user is performing including code-based information from a first of the plurality of disparate guidance data sources and description information from a second of the plurality of disparate guidance data sources, and being formatted to conform to a client-consumable format by the server based on a guidance information model that has been negotiated between the server and the client;
formatting the received guidance information according to composition information contained in the guidance response and format information associated with the guidance information model; and
displaying the formatted guidance information to the user to help the user accomplish the current task, the preceding steps being performed by at least one processor.

2. The method of claim 1 wherein receiving the request from the user comprises detecting that the user entered a search in a help query area.

3. The method of claim 1 wherein determining context information comprises determining a portion of an executing application of the software product with which the user is interacting.

4. The method of claim 1 wherein sending the guidance request comprises sending the request to a server process running on the same computer system as the client.

5. The method of claim 1 wherein sending the guidance request comprises sending the request to a central server accessible by multiple clients.

6. The method of claim 1 wherein the guidance model negotiated between the client and the server is negotiated dynamically through one or more metadata exchanges.

7. The method of claim 1 further comprising, at the client aggregating additional guidance data and combining local guidance results with guidance information received inform the server in the guidance response.

8. The method of claim 1 wherein formatting the received guidance information comprises mapping one or more specific topic and asset types with particular formatting attributes, so that topics or assets of a particular type are each displayed in a similar way.

9. The method of claim 1 wherein formatting the received guidance information comprises defining areas of a display where particular topic types are allowed to paint data, and wherein composition information includes markup or other metadata from the server defining how to display guidance information.

10. The method of claim 1 further comprising receiving user feedback related to the quality of the guidance, and providing the received user feedback to the server.

11. A client computer system for presentation of multiple sources of application guidance information, the system comprising:
a processor and a memory configured to execute software instructions embodied within the following components;
a context detection component located on the client that detects a context that describes information related to a task an end user is currently performing within an application executing on the client and information about the user;
a guidance retrieval component located on the client that requests guidance information for the task the end user is currently performing within the executing application from a server and provides the detected context from the client, the guidance information including code-based information from a first of the plurality of disparate guidance data sources and description information from a second of the plurality of disparate guidance data sources, and being formatted to conform to a client-consumable format by the server based at least in part on a data model negotiated between the client and the server and that includes software components and data definitions to allow the client and the server to communicate and understand a generic, standard model for application guidance information, the model comprising a content data store that stores defined topics, assets, and packages for request from the client; and
a user interface composition component that determines how to compose different tasks for display that a user will perform using a composition model, instantiates one or more related display views to collect user inputs, and displays the guidance information for the executing application to the end user.

12. The client computer system of claim 11 wherein the data model defines one or more available types of help information, how the types can be requested, and how the types are displayed by the client.

13. The client computer system of claim 11 wherein the context detection component detects at least one of a portion of the software application with which the user is currently interacting, and a goal of the user's current actions.

14. The client computer system of claim 11 wherein the guidance retrieval component receives information for displaying the content, including markup or other metadata and wherein the user interface composition component determines how to display content based on model and type information provided in the guidance information.

15. The client computer system of claim 11 wherein the user interface composition component maps guidance information to particular regions of a display designated for particular types of content.

16. The client computer system of claim 11 further comprising a quality voting component that receives feedback from the end user related to the quality of the received guidance content and provides the feedback to the server.

17. The client computer system of claim 11 further comprising a local aggregation component that aggregates data from multiple sources at the client and combines the aggregated data with guidance information received from the server.

18. The client computer system of claim 11 wherein the data model comprises an asset packaging component configured to receive information that defines one or more assets, the one or more assets forming an asset package related to the software product, wherein the asset package defines available guidance information for the software product.

19. The client computer system of claim 11 wherein the removing unsupported formatting information comprises removing information gathered via the Internet.

* * * * *